(12) United States Patent
Minear et al.

(10) Patent No.: US 7,120,429 B2
(45) Date of Patent: Oct. 10, 2006

(54) SYSTEM AND METHOD FOR LICENSING APPLICATIONS ON WIRELESS DEVICES OVER A WIRELESS NETWORK

(75) Inventors: Brian Minear, San Diego, CA (US); Richard Wayne Gardner, III, Solana Beach, CA (US); Stephen A. Sprigg, Poway, CA (US); Phil Tien Nguyen, San Diego, CA (US); Mitchell B. Oliver, San Diego, CA (US); Eric J. Lekven, Carlsbad, CA (US)

(73) Assignee: Qualcomm Inc., San Diego, CA (US)

( * ) Notice: Subject to any disclaimer, the term of this patent is extended or adjusted under 35 U.S.C. 154(b) by 181 days.

(21) Appl. No.: 09/929,174

(22) Filed: Aug. 13, 2001

(65) Prior Publication Data

US 2003/0032406 A1 Feb. 13, 2003

(51) Int. Cl.
*H04M 3/00* (2006.01)
(52) U.S. Cl. .......................... 455/419; 455/418; 705/59
(58) Field of Classification Search ................ 455/411, 455/410, 412.1, 414.2, 414.1, 418, 419; 705/59, 705/52; 713/190, 201, 200; 709/229; 717/168–178
See application file for complete search history.

(56) References Cited

U.S. PATENT DOCUMENTS

| 5,742,757 | A | * | 4/1998 | Hamadani et al. .......... 713/200 |
| 5,758,069 | A | | 5/1998 | Olsen |
| 5,790,664 | A | * | 8/1998 | Coley et al. ................ 709/203 |
| 5,935,243 | A | * | 8/1999 | Hasebe et al. ................ 726/26 |
| 6,101,606 | A | * | 8/2000 | Diersch et al. ............. 713/201 |
| 6,195,564 | B1 | * | 2/2001 | Rydbeck et al. ............ 455/557 |
| 6,223,288 | B1 | * | 4/2001 | Byrne ........................ 713/190 |
| 6,223,291 | B1 | * | 4/2001 | Puhl et al. .................. 713/201 |
| 2002/0049679 | A1 | * | 4/2002 | Russell et al. ................ 705/52 |
| 2002/0091645 | A1 | | 7/2002 | Tohyama |
| 2002/0107809 | A1 | * | 8/2002 | Biddle et al. ................. 705/59 |
| 2002/0120578 | A1 | | 8/2002 | Sy |
| 2002/0120579 | A1 | | 8/2002 | Kawaguchi et al. |
| 2002/0138441 | A1 | | 9/2002 | Lopatic |
| 2003/0088516 | A1 | * | 5/2003 | Remer et al. ................. 705/59 |

FOREIGN PATENT DOCUMENTS

| EP | 1130495 A2 | 9/2001 |
| GB | 2349548 A | 11/2000 |

* cited by examiner

*Primary Examiner*—Matthew D. Anderson
*Assistant Examiner*—Lewis West
(74) *Attorney, Agent, or Firm*—Philip R. Wadsworth; Robert J. O'Connell; Christopher S. Chow

(57) ABSTRACT

A system and method for controlling software applications on one or more wireless devices where each wireless device is in selective communication with one or more application managing servers over a wireless network. Each wireless device has one or more selectively executable resident software applications and at least one software application requires a valid license for each execution, and upon the attempted execution of a software application, the wireless device determines if a license is present. If a license is not present, the wireless device selectively prompts, either automatically or at the direction of the user of the wireless device, an application managing server for transmission of a license, receives the transmitted license, and installs the license on the wireless device such that the software application is again licensed and executable.

27 Claims, 5 Drawing Sheets

| Application | Client ID | Client Phone No. | Phone Model | Carrier | Region |
|---|---|---|---|---|---|
| Chess | 9002x | (111) 111-1111 | Sony™ 3250 | ATT™ | CA |
| Golf Score Keeper | 9003x | (222) 222-2222 | Samsung™ 9840 | Verizon™ | CA |
| Stock Monitor | 9004x | (333) 333-3333 | Qwest™ 2001 | QRSTU | NV |

Fig. 3

| Resident Application | License |
|---|---|
| Chess | 38 |
| Golf Score Keeper | 16Dec2001 |
| Stock Monitor | 2Feb2001 |

Fig. 4

SYSTEM AND METHOD FOR LICENSING APPLICATIONS ON WIRELESS DEVICES OVER A WIRELESS NETWORK

BACKGROUND OF THE INVENTION

I. Field of the Invention

The present invention generally relates to data networks and computer communications across the data networks. More particularly, the invention relates to the licensing of software applications being executed on wireless devices from one or more application managing servers on a wireless data network.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). These "smart" cellular telephone have installed application programming interfaces ("APIs") onto their local computer platform that allow software developers to create software applications that operate on the cellular telephone. The API sits between the wireless device system software and the software application, making the cellular telephone functionality available to the application without requiring the software developer to have the specific cellular telephone system source code.

The software applications can come pre-loaded at the time the wireless telephone is manufactured, or the user may later request that additional programs be downloaded over cellular telecommunication carrier networks, where the programs are executable on the wireless telephone. As a result, users of wireless telephones can customize their wireless telephones with programs, such as games, printed media, stock updates, news, or any other type of information or program available for download through the wireless network. Each of these software applications normally requires a license for the user to legally use the software on the wireless device. The license can be copied to the wireless device from the server with the software, or the license can be created on the wireless device as a file, key, or other resident object.

If a license is meant to limit the use of the software application to a finite duration, such as a specific number of times of execution or number of days of use, then once the license expires, a user of the wireless device must typically either download a new license to incorporate into the software application, or reinstall the entire software application if further use of the application is desired. The wireless device API normally checks the software either at the time execution is requested or at some other period to determine if the software is licensed for use on the platform. Alternatively, the wireless device can contact a server every time the execution of the software application is requested and the server, which then either sends permission or denial for execution of the application, can determine if a valid license is present. Although, if a communication link is expensive, such as a cellular telephone call, then the monitoring of the license preferably occurs on the wireless device.

If the license has expired, the wireless device will not execute the unlicensed software application, and if the user desires additional use of the software application, the user will typically either call a service provider or contact the service provider through other means, such as through an Internet access, and the service provider will either transmit a new license to the wireless device or transmit a new application that has a new license embedded within it. Thus, significant action must be undertaken by the user, such as contacting the service provider from the wireless device, which can be expensive, or waiting until a less expensive connection can be made, such as from a land-based telephone line or an Internet connection.

Accordingly, it would be advantageous to provide a system whereby a licensed software application can have its license renewed without significant action taken by the user of the wireless device to contact the software application provider. Further, such license should be readily integrated into the wireless device and software application so that a significant update or reload of the application is not necessary in order to use the new license. It is thus to the provision of such a system and method that can control the licensing of the software applications on wireless devices that the present invention is primarily directed.

SUMMARY OF THE INVENTION

The present invention is a system and method for controlling software applications on one or more wireless devices where each wireless device is in selective communication with one or more application managing servers over a wireless network, such as a cellular telecommunications network or a wireless WAN or LAN. Each wireless device has one or more selectively executable resident software applications that require a valid license for each execution of the application. Upon the attempted execution of a software application either automatically or at the direction of the user of the wireless device, the wireless device determines if a license is present. If a license is not present, the wireless device selectively prompts, either automatically or at the direction of the user, the application managing server for transmission of a license over the network, receives the license transmitted from the application managing server across the wireless network, and the wireless device installs the license such that the software application is again licensed and executable.

When the wireless device does not have a license for the execution of the software application, the wireless device can prompt the user of the wireless device to obtain the requisite license for execution of the software application. If authorized to obtain the requisite license, the wireless device will then bridge a communication link to the application managing server in order to prompt the application managing server to transmit the requisite license. The user will likely be charged for the license to execute the application, and the charging can occur at the time of obtaining the new license, such as purchase with a credit card number or other electronic funds transfer (EFT) method, or the application managing server can maintain the record for the download of the license and bill the user within the normal accounting cycle for use of the wireless device.

The application managing server can have only application license related data or the server can also selectively download entire software applications along with the requisite license to the wireless device over the wireless network. Because the server can have varying degrees of functionality and interface with one or more databases and other servers, the application managing server can also be the entire interface of the wireless device with the wireless network and provide all services to the wireless device. Thus, the application managing server is readily scalable.

There are several methods that the wireless device can utilize to determine if a license is present depending upon if the license is maintained at the wireless device or on an application managing server. If the application managing server stores the license for execution of a specific software application on a specific wireless device, upon the attempted execution of a software application on that wireless device, the wireless device will selectively prompt the application managing server for transmission of a singular license or a copy of a license maintained at the application managing server side. Otherwise the wireless device stores the license for execution of a specific software application, and the wireless device will determine if the license has expired.

The software application license can be of a finite duration such that a new license must be periodically obtained for continual usage of the software application. The license can thus expire based upon a fixed-durational criteria, such as on a fixed date, after a predetermined number of executions of the software application on the wireless device, after the elapse of a predetermined duration since the software application was downloaded to the wireless device, or after a predetermined duration of usage of the software application.

The present invention therefore includes a method for controlling software applications on one or more wireless devices, and the steps of the method can occur at the direction of a computer program executing on the computer platform of the wireless device. The inventive method includes the steps of attempting to execute a software application upon a wireless device, and determining if a license is present for the wireless device to execute the software application. If a license is not present, then the method includes the steps of selectively prompting the application managing server from the wireless device for transmission of a license, selectively transmitting a license from the application managing server to the wireless device, receiving the transmitted license at the wireless device, and installing the license on the wireless device such that the licensed software application is executable. The method also preferably includes the step of, upon the attempted execution of a software application for which a license is not present, prompting the user of the wireless device to obtain the requisite license for execution of the software application.

The step of determining if a license is present for the wireless device to execute the software application can be determining at the wireless device if a license is present to execute the software application, or determining at the application managing server if a license is present for the wireless device to execute the software application. Further, depending on the type of license present, the step of determining if a license is present for the wireless device to execute the software application can be determining if the license has expired based upon expiration on a fixed date, determining if the license has expired based upon a predetermined number of executions of the software application having occurred on the wireless device, determining if the license has expired after the elapse of a predetermined duration since the software application was downloaded to the wireless device, or determining if the license has expired after the elapse of a predetermined duration of usage of the software application. And dependent upon the manner in which the license is held within the system, i.e. on the wireless device or the application managing server, the step of selectively transmitting a license from the application managing server to the wireless device can be selectively transmitting a copy of a license for the software application of the wireless device held at the application managing server.

It is therefore the primary object of the present invention to provide a system and method to selectively license software applications on wireless devices that can renew the license across the wireless network through the prompting of an application managing server to transmit the requisite license. The transmitted license is readily integrated into the software application on the wireless device so that a significant update or reload of the software application is not necessary in order to use the new license. The present invention thus provides an advantage to the user of the wireless device in that the user can easily and quickly update the licenses for resident software applications without having to either call or contact the service provider for transmission or installation of the license.

Other objects, advantages, and features of the present invention will become apparent after review of the hereinafter set forth Brief Description of the Drawings, Detailed Description of the Invention, and the Claims.

BRIEF DESCRIPTION OF THE DRAWINGS

FIG. 3 is a file table resident on the application managing server and/or stored application-related database identifying the software applications that are downloaded to specific wireless devices.

FIG. 4 is a file table resident on the wireless device illustrating several resident software applications and the status of the respective licenses.

DETAILED DESCRIPTION OF THE INVENTION

Figure 1:
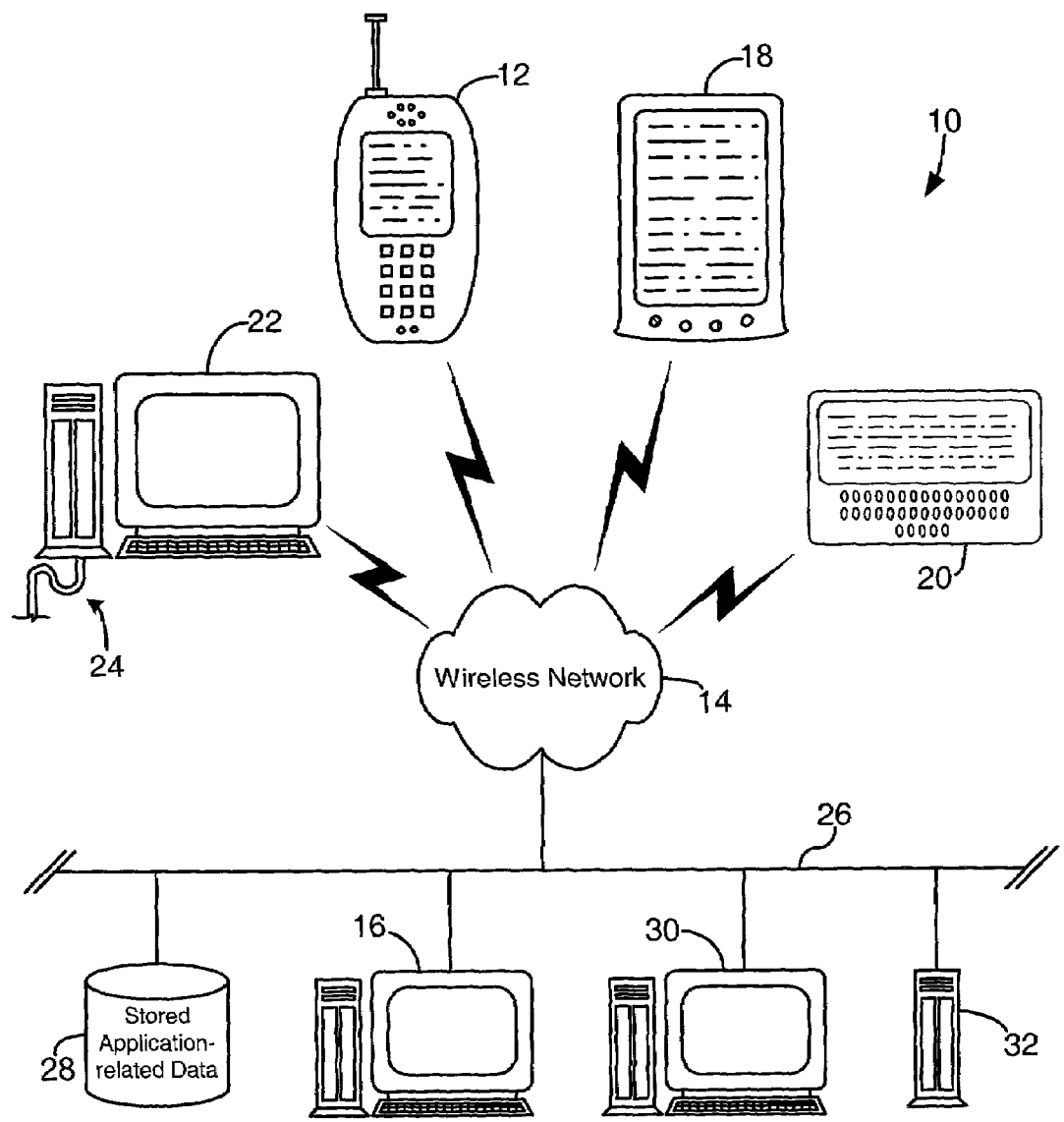
FIG. 1 is a representative diagram of a wireless network and the computer hardware and wireless devices that can be used within the inventive system.

With reference to the figures in which like numerals represent like elements throughout, FIG. 1 illustrates the present inventive system 10 for the system for controlling software applications on one or more wireless devices, such as cellular telephone 12, in communication across a wireless network 14 with at least one application download server 16 that selectively transmits software applications and licenses to wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The inventive system can thus be performed on any form of remote module including a wireless communication portal, including without limitation, wireless modems, PCMCIA cards, access terminals, personal computers, access terminals, telephones without a display or keypad, or any combination or sub-combination thereof.

The application managing server 16 is shown here on a local server-side network 26 with other computer elements in communication with the wireless network 14. There is a second server 30 and a stand-alone server 32, and each server can provide separate services and processes to the wireless devices 12,18,20,22 across the wireless network 14. There is preferably also at least one data store 28 containing stored-application related data includes the records for the specific applications downloaded by specific wireless devices 12,18,20,22, and the licenses and/or license status of the software applications, as is more clearly shown in FIG. 3.

Figure 2:
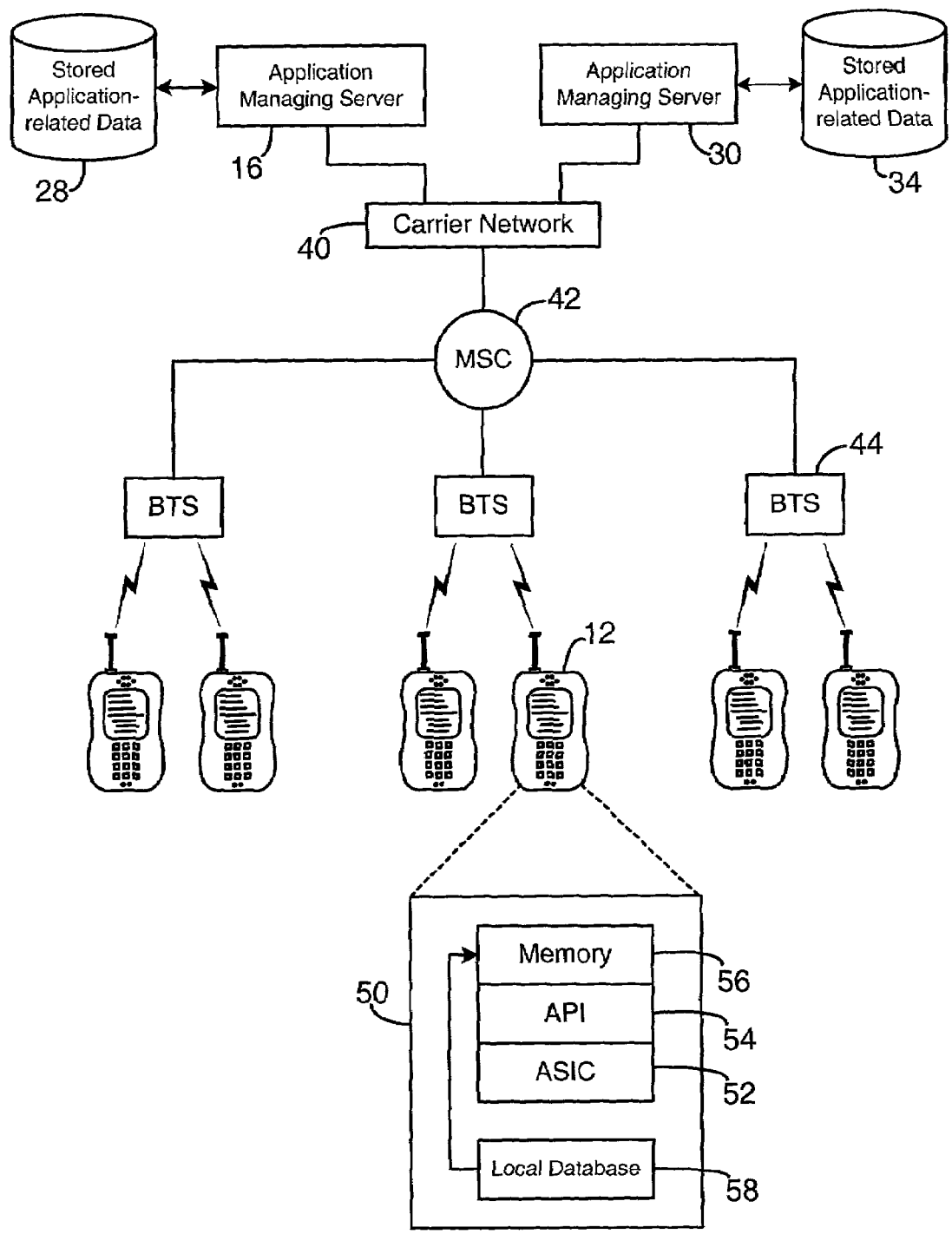
FIG. 2 is a block diagram of the hardware components of the wireless network providing communication between different wireless devices and the application managing servers and databases that provide software applications and licenses to the wireless devices.

In FIG. 2, a block diagram is shown that more fully illustrates the components of the wireless network 14 and interrelation of the elements of the present invention. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers. The application managing server 16 and the stored application-related database 28, which can include other application managing servers such as second application managing server 30 and a second stored application-related database 34, and any other components which are needed to provide cellular telecommunication services. The application managing server(s) 28,30 communicate with a carrier network 40, through a data link, such as the Internet, a secure LAN, WAN, or other network. The carrier network 40 controls messages (sent as data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ('SMS"), or other over-the-air methods known in the art.

The wireless device, such as cellular telephone 12, has a computer platform 50 that can receive and execute software applications transmitted from the application download server 16. The computer platform 50 includes an application-specific integrated circuit ("ASIC") 52, or other processor, microprocessor, logic circuit, or other data processing device. The ASIC 52 is installed at the time of manufacture of the wireless device and is not normally upgradeable. The ASIC 52 or other processor executes the application programming interface ("API") layer that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold applications not actively used in memory 56, as well as license information for the software applications. The local database 58 is typically a flash memory cell, but can be any secondary or tertiary storage device as known in the art, such as magnetic media, EPROM, EEPROM, optical media, tape, or soft or hard disk.

The wireless device, such as cellular telephone 12, accordingly downloads one or more software applications, such as games, news, sports data, stock monitors, and the like, with their associated licenses and holds the applications and licenses on the local database 58 when not in use. The actual license for the particular software application can be copied to the wireless device from the application managing server 16 with the software, or the license can be created on the wireless device as a file, key, other resident object, or in any manner known in the art. When the wireless device uploads stored resident applications from the local database 58 to memory 56 for execution on the API 54 when so desired by the user, the wireless device 12,18,20,22 will check the license associated with the specific application and if the license is no longer valid, then the wireless device will not execute that software application until a new license is downloaded to the computer platform 50 and is associated with the software application.

The system 10 controls the software applications on one or more wireless devices 12,18,20,22 through the provision of the licenses to the wireless devices across the wireless network 14. As each wireless device 12,18,20,22 can selectively communicate with one or more application managing servers 16,30, upon the attempted execution of a software application on the wireless device 12,18,20,22 for which a license is not present, the wireless device selectively prompts the application managing server 16,30 for transmission of a license, receives the transmitted license, and installs the license on the wireless device such that the licensed software application can be executed. It should be noted that the application managing server 16 prompted by the wireless device does not need to be the server actually sending the license to the wireless device. In such instance, the application managing server 16 can direct another server, such as server 30 to send the license to the wireless device, and have another server, such as server 32, keep the records of the software application download. In such manner, a distributed server-side network can manage the software applications and provide the licenses to the wireless devices 12,18,20,22 of the system 10.

In one embodiment, the wireless device 12,18,20,22, upon the attempted execution of a software application for which a license is not present, prompts the user of the wireless device to obtain the requisite license for execution of the software application, which would be necessary if the communication link to the wireless network 14 is billable to the user, such as a cellular telephone call. Otherwise, the prompting can occur automatically and the re-licensing process can occur transparently to the user.

The wireless device 12,18,20,22 typically stores the license for execution of a specific software application of the wireless device, preferably in the local database 58 of the computer platform 50 of the wireless device. Alternately, the application managing server 16 stores the license for execution of a specific software application on a specific wireless device 12,18,20,22 and upon the attempted execution of a software application on that wireless device, the wireless device selectively prompts the application managing server 16 for transmission of a copy of the license or a single execution license.

The license is typically of a finite duration so that the user will need to obtain additional licenses for extended use of a specific software application. An extant license on either the wireless device 12,18,20,22 or the application managing server 16 can expire based upon any criteria, such as expiration on a fixed date, after a predetermined number of executions of the software application on the wireless device (ex. 30 uses), after the elapse of a predetermined duration since the software application was downloaded to the wireless device, or after the elapse of a of predetermined duration of usage (ex. 30 minutes of execution). Other limiting criteria for software licenses as are known in the art are readily applicable to the license in the present invention as would be apparent to one of skill in the art.

One example of the storage and the application-related data is shown in FIG. 3, which is a table 60 held resident on the application managing server 16 or stored application-related database 28. The application column 62 holds three software applications, shown here as chess, a golf score keeper, and a stock monitor, and the specific client identification number 64 that has downloaded the particular application. The table 60 also has other client and application related data, such as the client phone number 66, the specific phone model 68, the carrier for telecommunication service 70, and the region of the carrier 72. The table 60 can be held in any relational, entity-relational, or object-oriented database on the application managing server 16 or on the stored application-related database 28.

In FIG. 4, the file table 80 reflects the specific resident applications 82 held on the wireless device 12,18,20,22, preferably in the local database 58. The resident applications 82, shown here as chess a golf score keeper, and a stock monitor, have corresponding license information, shown in license column 84. The license for chess is shown as having 38 remaining executions allowable on the wireless device 12,18,20,22 before another license would need to be obtained to again execute the chess application on the wireless device. The golf score keeper and the stock monitor applications expire after a date specific, or 16 Dec. 2001 and 2 Feb. 2001 respectively. The expiration date can be determined arbitrarily or can be calculated based upon of a number of days that have elapsed since the application was downloaded to the wireless device. If the licenses were maintained on the application managing server 16, then the license column 84 would appear in table 60 of FIG. 3, and the wireless device would always check the application managing server 16 prior to executing the specific software application.

Figure 5:
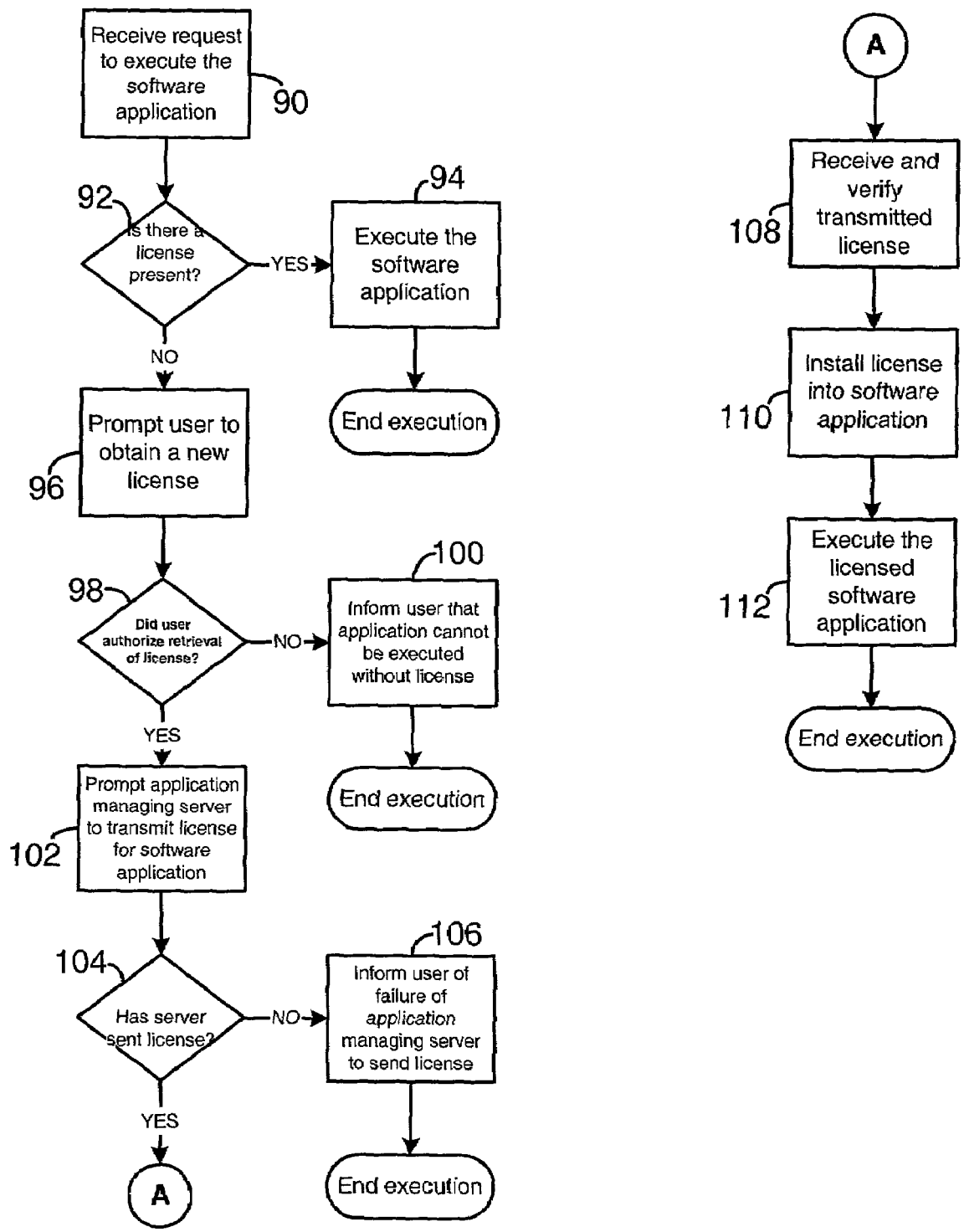
FIG. 5 is a flowchart illustrating a process executed by the wireless device to check a software application for a license prior to execution and obtaining a license from the application managing server if necessary.

FIG. 5 is flowchart illustrating the inventive method for controlling software applications on one or more wireless devices 12,18,20,22, which is executed on the computer platform 50 of the wireless device. In the method, the computer platform 50 receives a request that indicates the user or a process on the computer platform is attempting to execute a software application upon the wireless device 12,18,20,22, as shown at step 90, and then a determination is made as to whether a license is present for the wireless device to execute the software application, as shown at decision 92. If the license is present, then the software application is executed, as shown at step 94, and then the execution process is terminated.

If a license is not present at decision 92, then the wireless device 12,18,20,22 prompts the user to obtain a new license in order to execute the application, as shown at step 96, and determines whether the user authorized the retrieval of a new license, as shown at decision 98. If the user did not authorize the retrieval of the license, then the wireless device informs the user that application cannot be executed without a valid license, as shown at step 100, and the execution process terminates. Otherwise, if the user authorizes the retrieval of the license, then the wireless device prompts the application managing server 16 to transmit a new license for the software application, as shown at step 102. If the method is automated to obtain the new license, then the method does not include step 96, decision 98, and step 100. Once the application managing server 16 receives the prompt from the wireless device, the server 16 will send the license unless other criteria are required for transmission of the license, such as a credit card number or EFT number, or the existence of a valid account to which the cost for the downloaded license can be billed.

A determination is then made as to whether the application managing server 16 has sent the valid license, as shown at decision 104, and if not, the user is informed of the failure of the application managing server 16 to transmit the license, as shown at step 106, and then the execution process is terminated. If the license has been transmitted from the application managing server at step 104, then the wireless device receives and verifies receipt of the transmitted license, as shown at step 108, and installs the license on the wireless device, and preferably into the software application or at least associated therewith, such that the licensed software application can be executed. The transmission of the license can be the transmission of a full copy of a license, a partial copy of a license, a key, or other object that can update an existing license file or create a new license file for the software application on the wireless device 12,18,20,22. Once the new license is received (and a new license file created if so embodied), the now-licensed software application is then executed, as shown at step 112, and then the execution process terminates.

If the system 10 is intended to automatically retrieve the new license, then the user is only prompted of the failure of retrieval of the new licenses, such as at steps 100 and 106. Otherwise, the steps of the method can be executed and the new license obtained transparently to the user, and depending upon the speed of the network, wireless device computer platform 50, and the application managing server 16, the retrieval and installation can have an imperceptible duration.

Figure 6:
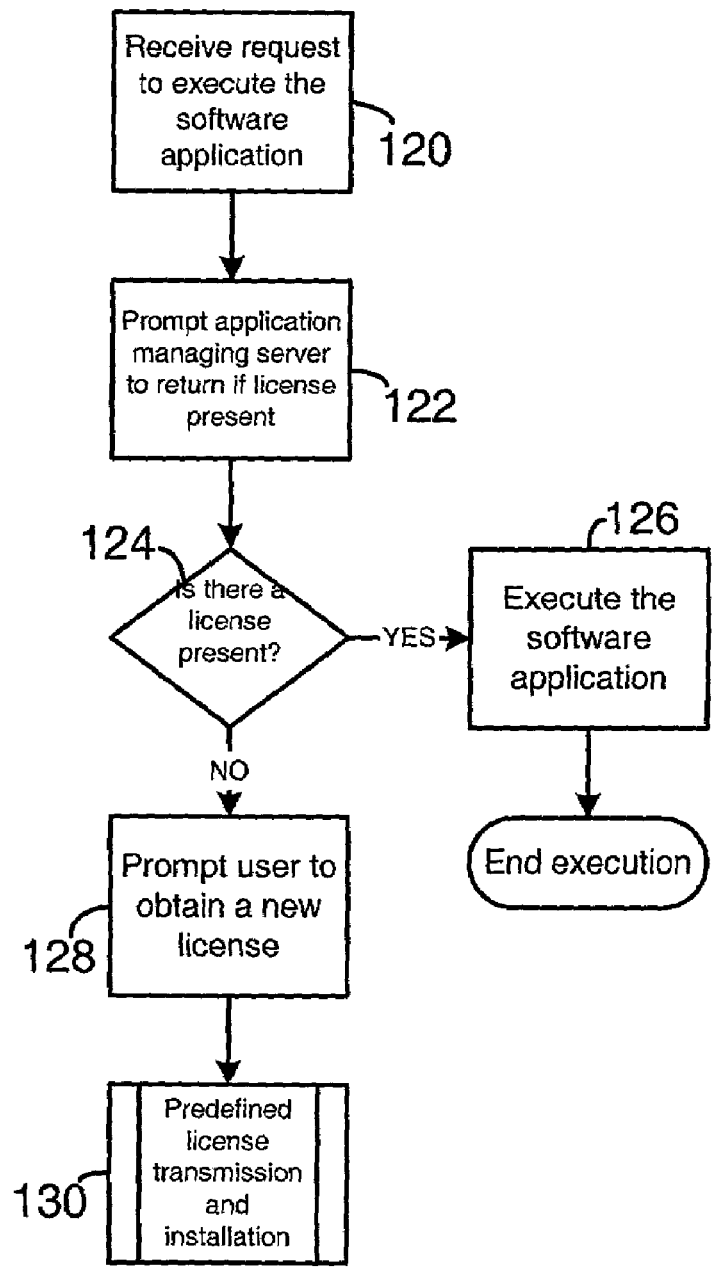
FIG. 6 is a flowchart of an alternate process for the wireless device checking the software application license prior to execution of the software application.

In the embodiment of FIG. 5, the step of determining if a license is present for the wireless device to execute the software application occurs at the wireless device. Thus, in an alternate embodiment shown in FIG. 6, the determination if a license is present for the wireless device to execute the software application is made through a communication link to the application managing server 16. In the alternate method, the request to execute the software application is received at the wireless device 12,18,20,22, as shown at step 120, and then the wireless device prompts the application managing server 16 to return a signal if a valid license is present, or obtainable, as shown at step 122. A decision is then made as to whether there is a license present based upon the signal received from the application managing server 16, as shown at decision 124. If there is a license present, then the software application is executed, as shown at step 126 and the execution process is terminated. Otherwise, if the license is not present or obtainable at decision 124, then the user is prompted to obtain a new license, as shown at step 128, i.e. have the user provide the means to secure a new license such as a credit card or EFT number. The remainder of the process is that as predefined in FIG. 5 after step 102, shown at predefined process 130. In this embodiment, if the license is stored on the application managing server 16, the step of selectively transmitting a license from the application managing server 16 to the wireless device 12,18,20,22 is selectively transmitting a copy of a license or a singular use license such that the actual license is still maintained on the application managing server 16.

In view of the inventive method, the present invention includes a program resident in a computer readable medium, where the program directs a wireless device having a computer platform to perform the inventive steps of the method. The computer readable medium can be the memory 56 of the computer platform 50 of the cellular telephone 12, or other wireless device, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

In the context of FIGS. 4 and 5, the present invention methods may be implemented, for example, by operating portion(s) of the wireless network 14 to execute a sequence of machine-readable instructions, such as wireless platform 50, the application managing servers 16,30, and stand alone server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including transmission media such as digital and analog.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method for controlling execution of software applications on a computer platform of a wireless device capable of communicating over a wireless network, comprising:
   (a) responsive to each request to execute an application, determining a first condition of whether there is installed in said computer platform a device license authorizing execution of said application as true or false, said determining being performed without opening any data connection over said wireless network to an application managing server;
   (b) after step (a), if said first condition is true, permitting said application to execute on said computer platform;
   (c) after step (a), if said first condition is not true, performing the steps of:
      (i) preventing said application from executing on said computer platform; and
      (ii) opening a data connection over said wireless network to said application managing server and requesting a license from said application managing server.

2. The method of claim 1, further comprising:
   (c)(iii) determining a second condition of whether said license is received from said application managing server as true or false;
   (c)(iv) after step (c)(iii), if said second condition is true, determining as a third condition of whether said license authorizes execution of said application as true or false; and (c)(v) after step (d)(iv), if said third condition is true, installing said license as said device license and permitting said application to execute on said computer platform.

3. The method of claim 2, further comprising:
   (c)(vi) after step (c)(iii), if said second condition is false, indicating to a user that said application cannot be executed.

4. The method of claim 1, wherein the device license is of a finite duration and expires on a fixed date.

5. The method of claim 1, wherein the device license expires after a predetermined number of executions of the software application on the wireless device.

6. The method of claim 1, wherein the device license is of a finite duration and expires after the elapse of a predetermined duration from when the software application was downloaded to the wireless device.

7. The method of claim 1, wherein the device license is of a finite duration and expires after the elapse of a predetermined duration of usage of the software application.

8. The method of claim 1, wherein the wireless device is a cellular telephone.

9. The method of claim 1, wherein the wireless device is a personal digital assistant.

10. The method of claim 1, wherein the wireless device is a pager.

11. A wireless device comprising:
    a wireless communications interface, for selectively communicating over a wireless network; and
    a computer platform, coupled to said wireless communications interface, for controlling said wireless communications interface, and for supporting and controlling execution of software applications, said computer platform comprising:
       a memory; and
       a processor, coupled to said memory, for controlling said wireless communications interface and for supporting and controlling execution of an application stored in said memory;
    wherein said processor is configured for:
    (a) responsive to each request to execute said application, determining a first condition of whether there is installed in said computer platform a device license authorizing execution of said application as true or false, said determining being performed without opening any data connection over said wireless network to an application managing server;
    (b) after step (a), if said first condition is true, permitting said application to execute on said computer platform;
    (c) after step (a), if said first condition is not true, performing the steps of:
       (i) preventing said application from executing on said computer platform; and
       (ii) opening a data connection over said wireless network to said application managing server and requesting a license from said server.

12. The wireless device of claim 11, wherein said processor is further configured for:
    (c)(iii) determining a second condition of whether said license is received from said application managing server as true or false;
    (c)(iv) after step (c)(iii), if said second condition is true, determining as a third condition of whether said license authorizes execution of said application as true or false; and (c)(v) after step (c)(iv), if said third condition is true, installing said license as said device license and permitting said application to execute on said computer platform.

13. The wireless device of claim 12, wherein said processor is further configured for:
(c)(vi) after step (c)(iii), if said second condition is false, indicating to a user that said application cannot be executed.

14. The wireless device of claim 11, wherein the device license is of a finite duration and expires on a fixed date.

15. The wireless device of claim 11, wherein the device license expires after a predetermined number of executions of the software application on the wireless device.

16. The wireless device of claim 11, wherein the device license is of a finite duration and expires after the elapse of a predetermined duration from when the software application was downloaded to the wireless device.

17. The wireless device of claim 11, wherein the device license is of a finite duration and expires after the elapse of a predetermined duration of usage of the software application.

18. The wireless device of claim 11, wherein the wireless device is a cellular telephone.

19. The wireless device of claim 11, wherein the wireless device is a personal digital assistant.

20. The wireless device of claim 11, wherein the wireless device is a pager.

21. A wireless device, comprising:
a wireless communication means, for selectively communicating over a wireless network; and
a computer platform means, coupled to said wireless communication means, for controlling said wireless communication means and for supporting and controlling execution of software applications, said computer platform means comprising:
a means for receiving a request to execute an application;
a means for responding to each attempt to execute an application by determining a first condition of whether there is installed in said computer platform means a device license authorizing execution of said application as true or false, said determining being performed without opening any data connection over said wireless network to an application managing server;
a means for permitting said application to execute on said computer platform means if said first condition is determined to be true by said means for responding;
a means for preventing said application from executing on said computer platform means and for opening a data connection over said wireless network to said application managing server and requesting a license from said server.

22. The wireless device of claim 21, wherein said computer platform means further comprises:
a means for determining a second condition of whether said license is received from said application managing server as true or false;
a means for determining a third condition of whether said license authorizes execution of said application as true or false if said second condition is determined to be true by said means for determining a second condition;
a means for installing said license as a device license and permitting said application to execute on said computer platform means if said third condition is determined to be true by said means for determining a third condition.

23. The wireless device of claim 22, wherein said computer platform means further comprises:
a means for indicating to a user of said wireless device that said application cannot be executed if said second condition is determined to be false by said means for determining said second condition.

24. A method for controlling execution of software applications on a computer platform of a wireless device capable of communicating over a wireless network, comprising:
(a) responsive to each request to execute an application, determining a first condition of whether there is installed in said computer platform a device license authorizing execution of said application as true or false, said determining being performed without opening any data connection over said wireless network to an application managing server;
(b) after step (a), if said first condition is true, permitting said application to execute on said computer platform;
(c) after step (a), if said first condition is not true, performing the steps of:
(i) preventing said application from executing on said computer platform;
(ii) prompting a user of said wireless device to authorize a transaction to obtain a license from said application managing server;
(iii) if said user authorized said transaction, performing said transaction by performing the steps of:
(A) opening a data connection over said wireless network to said application managing server and requesting a license from said application managing server;
(B) determining a second condition of whether said license is received from said application managing server as true or false;
(C) after step (B), if said second condition is true, determining as a third condition of whether said license authorizes execution of said application as true or false; and
(D) after step (C), if said third condition is true, installing said license as said device license and permitting said application to execute on said computer platform.

25. A computer readable medium tangibly storing a sequence of instructions, which when executed by a computer platform of a wireless device capable of communicating over a wireless network, said computer platform supporting and controlling execution of software applications, causes said computer platform to perform the steps of:
(a) responsive to each request to execute an application, determining a first condition of whether there is installed in said computer platform a device license authorizing execution of said application as true or false, said determining being performed without opening any data connection over said wireless network to an application managing server;
(b) after step (a), if said first condition is true, permitting said application to execute on said computer platform;
(c) after step (a), if said first condition is not true, performing the steps of:
(i) preventing said application from executing on said computer platform; and (ii) opening a data connection over said wireless network to said application managing server and requesting a license from said application managing server.

26. The computer readable medium of claim 25, wherein said steps further comprises:
(c)(iii) determining a second condition of whether said license is received from said application managing server as true or false;
(c)(iv) after step (c)(iii), if said second condition is true, determining as a third condition of whether said license authorizes execution of said application as true or false; and
(c)(v) after step (c)(iv), if said third condition is true, installing said license as said device license and permitting said application to execute on said computer platform.

27. The computer readable medium of claim 26, wherein said steps further comprises:
(c)(vi) after step (c)(iii), if said second condition is false, indicating to a user that said application cannot be executed.

* * * * *